United States Patent
Li et al.

(10) Patent No.: US 10,594,216 B2
(45) Date of Patent: Mar. 17, 2020

(54) CONFIGURABLE VOLTAGE DROP COMPENSATION METHOD AND APPARATUS FOR VOLTAGE REGULATORS

(71) Applicant: DELL PRODUCTS, LP, Round Rock, TX (US)

(72) Inventors: Hang Li, Austin, TX (US); Shiguo Luo, Austin, TX (US); Mehran Mirjafari, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/934,298

(22) Filed: Mar. 23, 2018

(65) Prior Publication Data
US 2019/0294480 A1   Sep. 26, 2019

(51) Int. Cl.
H02M 3/158     (2006.01)
H02M 1/32      (2007.01)
H02M 1/00      (2006.01)

(52) U.S. Cl.
CPC ............. *H02M 3/158* (2013.01); *H02M 1/32* (2013.01); *H02M 3/1588* (2013.01); *H02M 2001/0025* (2013.01)

(58) Field of Classification Search
CPC ......... H02M 2001/0025; H02M 3/156; H02M 3/1588
See application file for complete search history.

(56) References Cited

U.S. PATENT DOCUMENTS

| | | | |
|---|---|---|---|
| 8,782,652 B2 | 7/2014 | Takami | |
| 9,590,510 B1* | 3/2017 | Sheng | H02M 3/33507 |
| 9,729,073 B1* | 8/2017 | Ke | H02M 3/33507 |
| 2007/0103134 A1* | 5/2007 | Yang | H02M 3/33523 |
| | | | 323/282 |
| 2009/0033307 A1* | 2/2009 | Park | H02M 3/156 |
| | | | 323/293 |
| 2010/0148730 A1* | 6/2010 | Choi | H02J 7/08 |
| | | | 320/145 |
| 2010/0281284 A1* | 11/2010 | Kasprzak | G06F 1/28 |
| | | | 713/324 |
| 2012/0038329 A1* | 2/2012 | Hampo | H02J 1/06 |
| | | | 323/234 |
| 2013/0027987 A1* | 1/2013 | Yang | H02M 3/33592 |
| | | | 363/21.14 |
| 2013/0064566 A1* | 3/2013 | Kojima | H02M 3/33523 |
| | | | 399/88 |
| 2013/0121044 A1* | 5/2013 | Gao | H02M 1/32 |
| | | | 363/50 |
| 2014/0016374 A1* | 1/2014 | Yang | H02M 3/33507 |
| | | | 363/21.15 |

(Continued)

*Primary Examiner* — Fred E Finch, III
(74) *Attorney, Agent, or Firm* — Larson Newman, LLP (57) ABSTRACT

An information handling system includes a voltage regulator control circuit having a programming resistor input pin for receiving an input from a programming resistor and an ammeter input for receiving a current value. A power source provides power to a load circuit coupled to the power source via a non-remote-sensing power connection. In accordance with at least one embodiment, the voltage regulator control circuit assures a reliable input to an overvoltage protection circuit of the voltage regulator control circuit regardless of states of connections of the load circuit to the power source.

20 Claims, 3 Drawing Sheets

(56) References Cited

U.S. PATENT DOCUMENTS

| | | | |
|---|---|---|---|
| 2015/0015078 A1* | 1/2015 | Kim | H03K 19/0175 |
| | | | 307/103 |
| 2015/0089253 A1* | 3/2015 | Doering | G06F 1/26 |
| | | | 713/300 |
| 2015/0103566 A1* | 4/2015 | Keogh | H02M 3/33507 |
| | | | 363/21.12 |
| 2015/0194836 A1* | 7/2015 | Teo | H02J 7/0072 |
| | | | 320/163 |
| 2015/0207343 A1* | 7/2015 | Zhai | H02M 3/158 |
| | | | 320/112 |
| 2015/0333514 A1* | 11/2015 | Wang | H02J 1/14 |
| | | | 307/103 |
| 2016/0054749 A1* | 2/2016 | Fujiwara | G05F 1/575 |
| | | | 323/273 |
| 2016/0241068 A1* | 8/2016 | Zhao | H02J 7/0052 |
| 2016/0254752 A1* | 9/2016 | Wood | G06F 1/305 |
| | | | 363/15 |
| 2016/0313275 A1 | 10/2016 | Han et al. | |
| 2016/0357204 A1* | 12/2016 | Lu | H02M 3/156 |
| 2017/0235761 A1 | 8/2017 | Bafna et al. | |
| 2018/0115237 A1* | 4/2018 | Morin | H02M 3/156 |
| 2018/0152036 A9* | 5/2018 | Zhao | H02J 7/0052 |
| 2018/0164355 A1* | 6/2018 | Winkler | G01R 27/08 |

* cited by examiner

CONFIGURABLE VOLTAGE DROP COMPENSATION METHOD AND APPARATUS FOR VOLTAGE REGULATORS

FIELD OF THE DISCLOSURE

This disclosure generally relates to information handling systems, and more particularly relates to control of voltage delivered to a load by a power source.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method, apparatus, and information handling system utilize a power source including a voltage regulator control circuit that has a programming resistor input pin for receiving an input from a programming resistor and an ammeter input for receiving a current value. The power source provides power to a load circuit, the load circuit coupled to the power source for receiving power from the power source. The load circuit may be coupled to the power source via a non-remote-sensing power connection. The voltage regulator control circuit may assure a reliable input to an overvoltage protection circuit of the voltage regulator control circuit regardless of states of connections of the load circuit to the power source.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
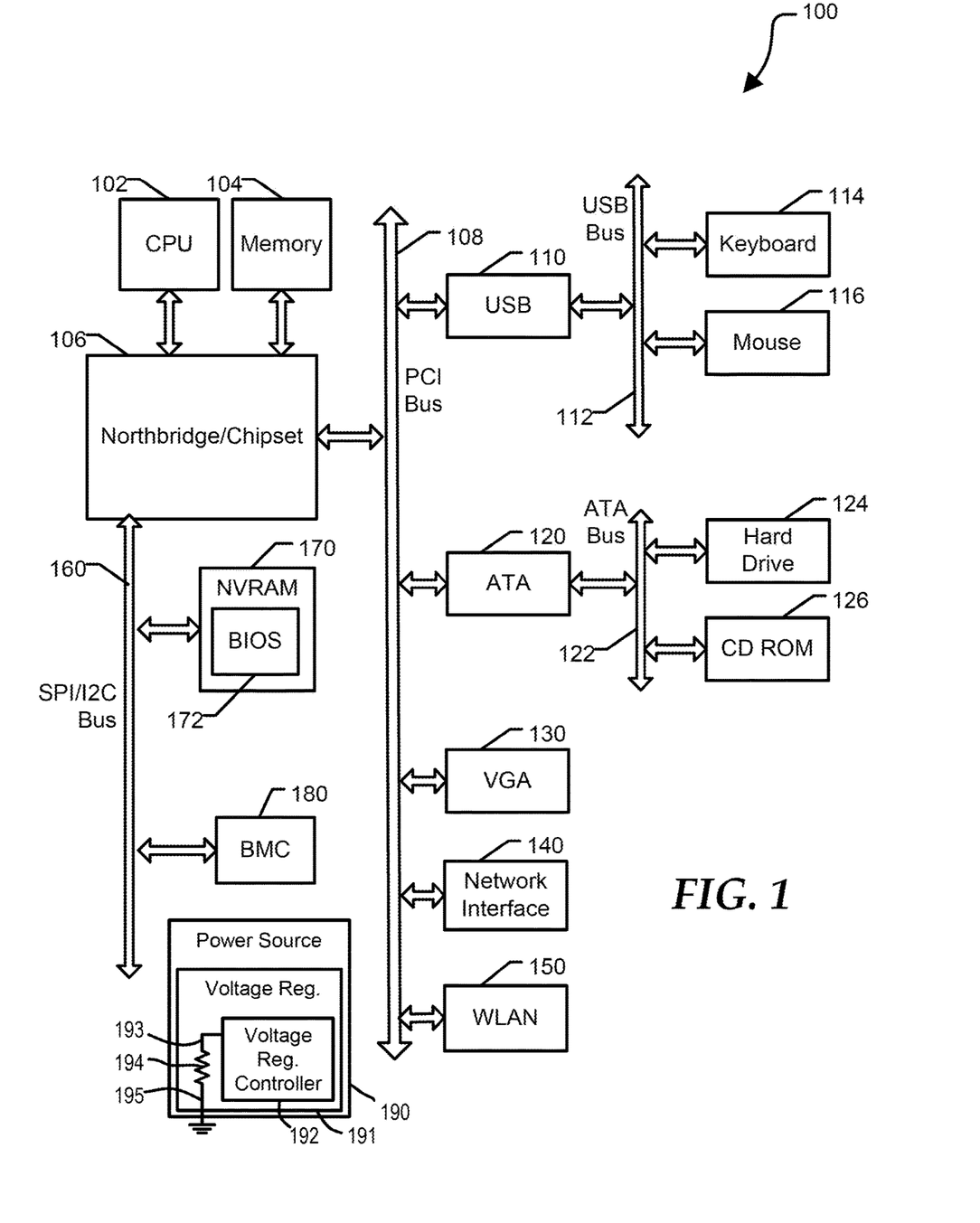
FIG. 1 is a block diagram of an information handling system according to an embodiment of the present disclosure.

FIG. 1 illustrates a general information handling system 100 including a processor 102, a memory 104, a northbridge/chipset 101, a PCI bus 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of northbridge/chipset 101 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Information handling system 100 comprises power source 190 to provide one or more electrical outputs to power the above-described elements of information handling system 100. Accordingly, power source 190 is coupled to the above-described elements of information handling system 100, although the electrical connections are not shown so as to avoid obscuring FIG. 1. The electrical connections from power source 190 to the other elements of information handling system 100 are not entirely free of electrical resistance. Ohm's Law states that voltage is equal to current multiplied by resistance. Thus, across an electrical connection exhibiting an electrical resistance, a voltage drop will exist equal to that electrical resistance multiplied by the amount of electrical current passing through that electrical connection.

In accordance with at least one embodiment, power source 190 comprises voltage regulator 191. In accordance with at least one other embodiment, voltage regulator 191 may be implemented such that power source 190 does not comprise voltage regulator 191. In accordance with at least one embodiment, power source 190 may be a power supply unit (PSU) of information handling system 100. In accordance with at least one embodiment, power source 190 may be a circuit for providing power to at least one other element of information handling system 100. In accordance with at least one embodiment, such a circuit may be downstream from a PSU of information handling system 100. Voltage regulator 191 is a circuit that regulates the voltage or voltages provided by power source 190. Voltage regulator 191 comprises voltage regulator controller 192. Voltage regulator controller (VRC) 192 is a circuit that controls the operation of voltage regulator 191 in providing voltage regulation. VRC 192 is provided with an electrical terminal, known as a pin, 193 for the connection of an external programming resistor 194 to VRC 192. As shown, a first terminal of programming resistor 194 can be connected to pin 193, and a second terminal of programming resistor 194 can be connected to a reference potential, such as ground potential 195.

Devices in information handling systems can be sensitive to the voltage or voltages used to power them. If a voltage drop along a conductive path, which may include, for example, printed circuit board (PCB) conductive traces and electrical connectors, is excessive, that voltage drop can reduce the voltage being supplied by the power source to a point where the devices of an information handling system powered by the power source do not operate properly. Ideally, a power source provides the specified voltage or voltages for devices of an information handling system at the devices themselves, thereby ensuring proper operation of the devices.

The term "remote sensing," as used herein, refers to providing sensing conductors to conduct one or more voltages of one or more power source output conductors from a point of measurement at or near one or more electrical loads served by the one or more power source conductors back to one or more voltage regulators that regulate the one or more voltages. Attempts have been made to provide remote sensing leads at a load to allow a power source to measure the voltage at the load and to increase the power source's output voltage to compensate for the voltage drop along the electrical connection between the power source and the load, thereby delivering the load's specified voltage to the load. However, a system using remote sensing leads presumes that each of the electrical connections for delivering the electric power to the load and each of the remote sensing leads be reliably connected during operation. If a remote sensing lead is not properly connected to the power source, the power source may not see the full voltage being provided to the load or may not see any voltage at all. In such situations, the power source may interpret the low or no voltage measurement as an indication that the power source should increase its output voltage to compensate for increased resistance along the electrical connections delivering electric power from the power source to the load. However, if those electrical connections are not, in fact, exhibiting increased resistance, and, therefore, increased voltage drop, then the increased output voltage of the power source can result in application of excessive voltage to the device or devices of the information handling system, potentially damaging the devices.

The load or loads of a voltage regulator (VR) can change depending on the working conditions and configurations. In order to have a regulated voltage at the load side, voltage regulators (VRs) have used a pair of remote sense lines to sense the output voltage at the point of load (POL). However, in some of application cases where the remote sense lines and power lines cannot be designed into the same one connection cable and connector, user might connect remote sense lines only while leaving power lines disconnected. As a result, output capacitors at the remote load side cannot be charged up in time when VR output is ramping up during startup. Consequently, a VR controller may see a lower feedback voltage and thus attempt to catch up reference voltage by running its maximum duty cycle until a damage is induced or under voltage protection (UVP) is triggered. Furthermore, using physical remote voltage sensing lines also induced hardware cost and layout and design complexity. Also, damage from overvoltage phenomena caused by abnormal physical remote voltage sensing techniques can extend to other parts of a information handling system or its ancillary equipment, such as a battery back-up unit (BBU).

In accordance with at least one embodiment, a virtual remote output voltage sensing system and method are provided. Such a system and method and allow physical remote sense lines to be avoided while good output voltage regulation can still be achieved at the remote load side. As such, the above stated problem can be resolved by removing the remote voltage sense lines and doing only local VR output voltage sensing. From the motherboard VR output to the remote load side, which, for example, could be on a daughter card, there could exist printed circuit board (PCB) conductive trace resistance, power connector resistance, power line (e.g., wire) resistance, etc. All of these impedances together are referred to as the summed resistance, denoted as Rloss. When the VR delivers current to the remote loads, the voltage at the remote load side will be Vremote=Vout−Iout*Rloss, where Vout is the regulated VR output voltage and Iout is the VR output current.

From above formula, it can be seen that remote voltage varies as load current Iout and summed resistance Rloss change. In modern voltage regulators, load current can be easily sensed and monitored by a VR controller of the voltage regulator in the power source. The VR controller is able to establish a value for the output voltage proportional to Iout by a selected constant resistance R, i.e., Vout can be expressed as Vout=Vout@0 A+Iout*R, where Vout@0 A is the output voltage at 0 A (zero current), which is the initial set point of the output voltage. Ideally, the I*R voltage drop impact at the load side can be canceled, and the need for remote sense lines can be eliminated, if Iout*R is programmed to equal to Iout*Rloss. The VR controller can dedicate one pin to program through an external resistor Rp to make R match Rloss. Temperature compensated networks can also be added to match Rloss changes with temperature.

In accordance with at least one embodiment, a voltage regulator controller (VRC) provides compensation of electrical connection resistance between the power source and the load using a non-remote-sensing power connection. The term "non-remote-sensing power connection," as used herein, refers to providing power to one or more electrical loads via one or more power source output conductors without providing remote sensing conductors to conduct one or more voltages of one or more power source output conductors from a point of measurement at or near one or more electrical loads served by the one or more power source conductors back to one or more voltage regulators that regulate the one or more voltages. Rather, the point of measurement for a non-remote-sensing power connection is at or near the one or more voltage regulators that regulate the one or more voltages of the one or more power source output conductors. Thus, for a non-remote-sensing power connection, the one or more voltage regulators sample the one or more voltages of the one or more power source output conductors locally at or near the one or more voltage regulators rather than remotely at or near the one or more electrical loads.

The non-remote-sensing power connection does not have a remote connection on its load side. Rather, a loss value representative of the electrical connection resistance is provided to the VRC by installation of a programming resistor connected to a pin of an integrated circuit (IC) package of the VRC. The resistor voltage need not be equal to the electrical connection resistance. As an example, a gain stage can be provided to scale a larger programming resistor value to represent a smaller electrical connection resistance value. Thus, commonly available resistor values can be used to represent commonly encountered electrical connection resistance values.

Figure 2:
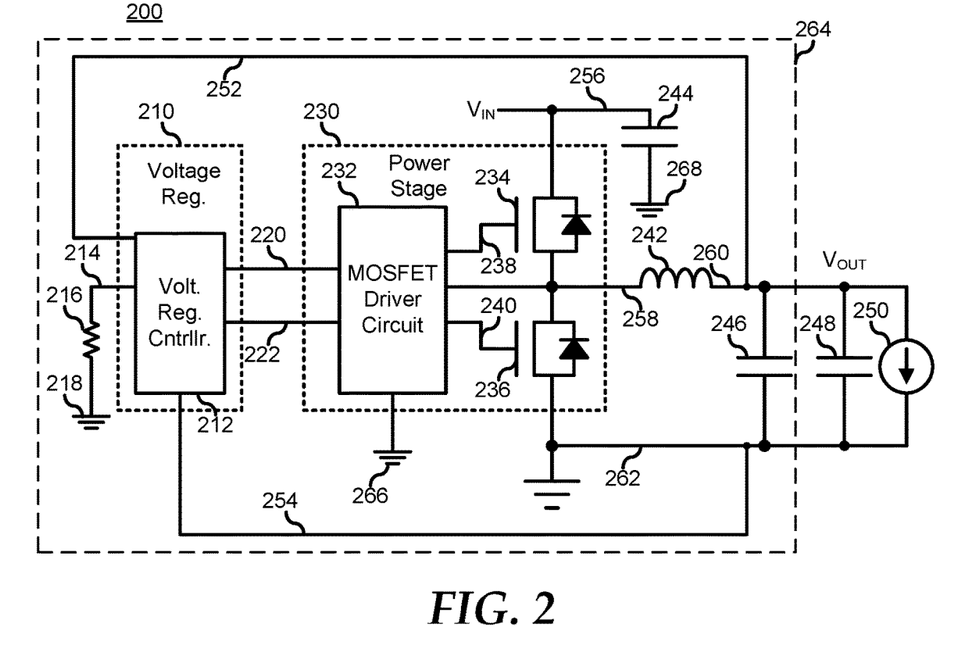
FIG. 2 is a schematic diagram illustrating a power source including a voltage regulator having a voltage regulator controller for an information handling system according to an embodiment of the present disclosure.

FIG. 2 is a schematic diagram illustrating a power source comprising a voltage regulator comprising a voltage regulator controller for an information handling system according to an embodiment of the present disclosure. System 200 comprises power source 264. Power source 264 comprises voltage regulator 210, programming resistor 216, power stage 230, capacitor 244, inductor 242, and capacitor 246. Voltage regulator 210 comprises voltage regulator controller 212. Voltage regulator controller 212 is provided with a pin 214 for connection of a programming resistor 216 for specifying a voltage drop of electrical connections between power source 264 and electrical load 250. A first terminal of programming resistor 216 is connected to pin 214. A second terminal of programming resistor 216 is connected to a reference potential, such as ground potential 218.

Power stage 230 comprises MOSFET driver circuit 232, high-side metal oxide semiconductor field effect transistor (MOSFET) 234, low-side MOSFET 236, and a reverse protection diode for each of high-side MOSFET 234 and low-side MOSFET 236. Voltage regulator controller 212 provides a pulse width modulation (PWM) output signal to MOSFET driver circuit 232 of power stage 230 via interconnect 220. Voltage regulator controller 212 provides an enable output signal to MOSFET driver circuit 232 of power stage 230 via interconnect 222.

MOSFET driver circuit 232 is coupled to a reference potential, such as a ground potential 266. MOSFET driver circuit 232 provides a high-side drive output 238 to a gate terminal of high-side MOSFET 234 to control switching of high-side MOSFET 234. MOSFET driver circuit 232 provides a low-side drive output 240 to a gate terminal of low-side MOSFET 236 to control switching of low-side MOSFET 236. An input voltage Vin at node 256 is coupled to a first terminal of capacitor 244. A second terminal of capacitor 244 is coupled to a reference potential, such as ground potential 268. Node 256 is coupled to a first terminal of high-side MOSFET 234. A second terminal of high-side MOSFET 234 is coupled to node 258, which is also coupled to a first terminal of low-side MOSFET 236, to a switch feedback terminal of MOSFET driver circuit 232, and to a first terminal of inductor 242. A second terminal of low-side MOSFET 236 is coupled to a reference potential, such as ground potential 262. A second terminal of inductor 242 is coupled to a first terminal of capacitor 246. A second terminal of capacitor 246 is coupled to a reference potential, such as ground potential 262. The action of the switching of high-side MOSFET 234 and low-side MOSFET 236 and their influence on the electric and magnetic states of inductor 242 provide current to charge capacitor 246 to an output voltage Vout at node 260. The output voltage Vout at node 260 and the reference potential at ground potential 262 are coupled to a load 250 and capacitor 248 in parallel with load 250. While at least one embodiment may be practiced without additional voltage sensing leads from load 250 to voltage regulator controller 212, local voltage sensing leads may be provided within power source 264. For example, local positive voltage sensing lead 252 is coupled to node 260 and to a local positive voltage sensing input of voltage regulator controller 212, and local negative voltage sensing lead 254 is coupled to node 262 and to a local negative voltage sensing input of voltage regulator controller 212.

The circuitry of FIG. 2 can be considered to show an improved VR implementing the virtual remote voltage sensing method described herein. A benefit of this technique is that, by adding one pin to the VR controller of the VR and by removing the actual remote voltage sense lines, the system and method can prevent damage caused by false operation of the connectors and can simplify the circuit design, the PCB layout, and the connector designs.

In accordance with at least one embodiment, virtual remote sensing can be achieved by providing an adjustable positive load line to replace what has typically heretofore been done through remote sense lines. Adjustable compensation of positive supply voltage droop by a dedicated IC pin-strapping to replace physical remote sense overcomes the uncertainties of previous techniques that required entirely reliable connections for both power connections and physical remote sensing lines. A pin-strapping resistance technique provides a simple cost-effective way to implement a matched power delivery impedance, and thus IR drop impact can be canceled.

Figure 3:
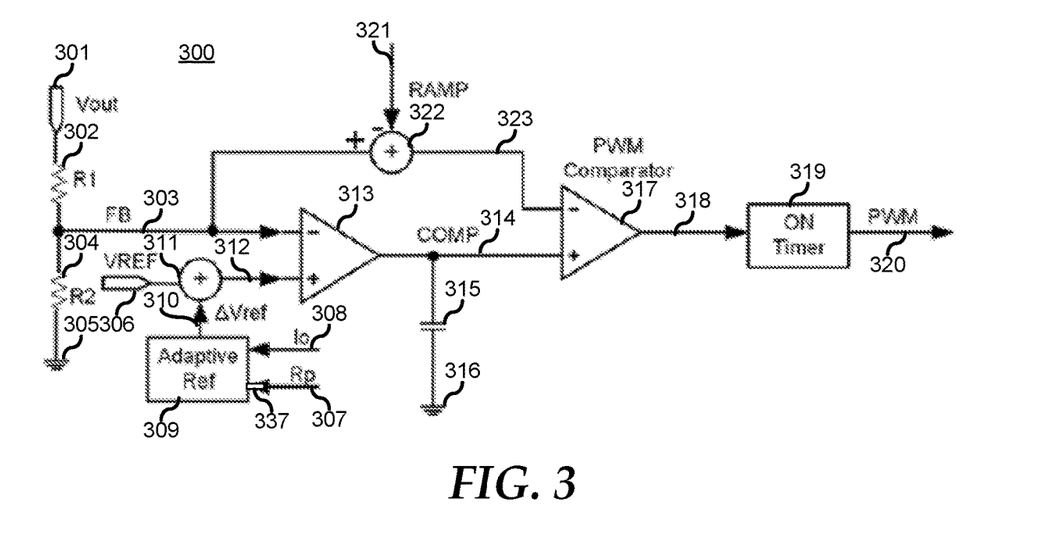
FIG. 3 is a schematic diagram illustrating a voltage regulator controller according to an embodiment of the present disclosure.

FIG. 3 is a schematic diagram illustrating a voltage regulator controller according to an embodiment of the present disclosure. Circuit 300 comprises a local positive voltage sensing lead input 301 for locally sensing the power source output voltage Vout within the power source. Local positive voltage sensing lead input 301 is coupled to a first terminal of resistor 302. A second terminal of resistor 302 is coupled to node 303 and to a first terminal of resistor 304. A second terminal of resistor 304 is coupled to a reference potential, such as ground potential 305. Resistors 302 and 304 act as a voltage divider to provide a feedback voltage at node 303.

Node 303 is coupled to an inverting input of operational amplifier 313 and to a noninverting input of summer 322. A ramp signal at node 321 is provided to an inverting input of summer 322. Summer 322 is coupled to node 323 and provides the sum of its inputs to an inverting input of PWM comparator 317 via node 323. A reference voltage Vref at node 306 is provided to a first input of summer 311. An electric current measurement value 308 is provided by an ammeter to an Io input of adaptive reference circuit 309. A programming resistor value 307 is provided from a programming resistor to a Rp input of adaptive reference circuit 309 at programming resistor input pin 337. Adaptive reference circuit 309 provides, at node 310, a voltage reference adjustment value ΔVref based on a product of programming resistor value 307 and electric current measurement value 308 to a second input of summer 311. Summer 311 adds the value of voltage reference adjustment value ΔVref to the reference voltage Vref to provide an adjusted reference voltage at node 312, which is coupled to a noninverting input of operational amplifier 313. Operational amplifier 313 compares the feedback voltage at node 303 to the adjusted reference voltage at node 312 to provide a comparator reference voltage COMP at node 314. Node 314 is coupled to a first terminal of capacitor 315. A second terminal of capacitor 315 is coupled to a reference potential, such as ground potential 316. Node 314 is coupled to a noninverting input of PWM comparator 317. PWM comparator 317 compares the voltages at its inputs and provides a output at node 318, which is coupled to an input of on timer 319. On timer 319 determines a duty cycle (on time) of a PWM signal, which it outputs at node 320. The PWM signal is coupled to a MOSFET driver circuit to drive MOSFETs in a power stage.

FIG. 3 illustrates an example of how voltage drop compensation can be implemented by adding an adaptive reference voltage ΔVref to the controller internal reference voltage VREF. The adaptive reference voltage generator takes Io and Rp as the input and generate $\Delta V_{ref} = R_p * G * I_o$, where G is a constant gain. Accordingly, the new reference value is Vref+ΔVref, and the output voltage Vout is can be expressed as follows:

$$Vout=(Vref+\Delta Vref)*((R1+R2)/R2) \quad \text{[Equation 1]}.$$

By replacing $\Delta Vref$ by $Rp*G*Io$, the equation becomes the following:

$$Vout=Vref*((R1+R2)/R2)+Rp*G*Io*((R1+R2)/R2) \quad \text{[Equation 2]}.$$

By defining $R=Rp*G*((R1+R2)/R2)$, Equation 2 becomes as follows:

$$Vout=Vout@0A+R*Io \quad \text{[Equation 3]}.$$

By configuring the programming resistor Rp to make $R=Rp*G*((R1+R2)/R2) \approx Rloss$, the voltage at the remote load side can be made to be $Vout@0\ A+Io*R-Io*Rloss \approx Vout@0\ A$, which is the initial set point of the output voltage. The voltage IR drop caused by a summed resistance, denoted as Rloss, can be canceled by adjusting the output voltage with a pin-strapping external programming resistor. Now, without the actual remote voltage sense lines, the remote load side still has the regulated Vout no matter how the load current changes, as if the VR is still sensing the remote load side output voltage using remote sensing leads, but no such remote sensing leads are now necessary.

Figure 4:
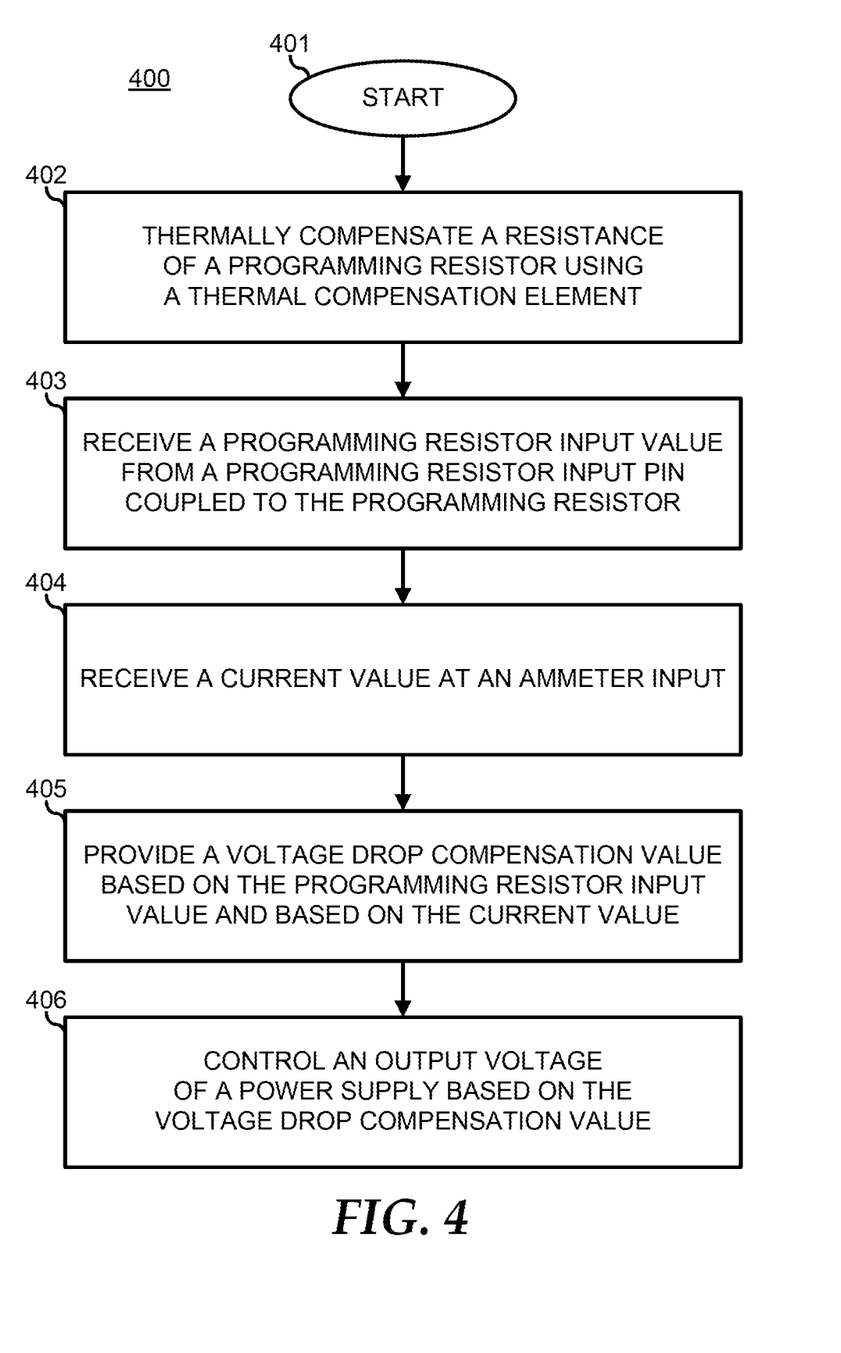
FIG. 4 is a flow diagram illustrating a method for controlling a voltage delivered to a load of an information handling system according to an embodiment of the present disclosure.

FIG. 4 is a flow diagram illustrating a method for controlling a voltage delivered to a load of an information handling system according to an embodiment of the present disclosure. Method 400 begins at block 401 and continues to block 402. At block 402, a resistance of a programming resistor is thermally compensated using a thermal compensation element. As an example, the programming resistor may be selected to be a thermistor, exhibiting a temperature dependence of its resistance. As another example, a relatively thermally insensitive resistor may be combined in a resistor network with a thermistor to yield a combined resistance that can provide thermal compensation. One or more other thermally insensitive resistors or one or more thermistors may be combined to form a resistor network having the desired characteristics.

From block 402, method 400 continues to block 403. At block 403, a resistor programming input value is received from a programming resistor input pin coupled to the programming resistor. From block 403, method 400 continues to block 404. At block 404, a current value is received at an ammeter input. From block 404, method 400 continues to block 405. At block 405, a voltage drop compensation value is provided based on the programming resistor input value and based on the current value. From block 405, method 400 continues to block 406. At block 406, an output voltage of a power source is controlled based on the voltage drop compensation value.

Load 250 is configured to receive the output voltage $V_{OUT}$ to perform a particular processing task. For example, load 250 can represent an information handling system or a particular portion of an information handling system, as needed or desired. Load 250 is characterized by the fact that the current drawn by the load varies based upon the needs of the processing task. For example, load 250 can draw a large current at a first time, based upon a large demand for the particular processing task, and can draw a small current at a second time, based upon a small demand for the particular processing task. In a particular example, voltage regulator 210 can represent a voltage regulator for a central processing unit (CPU). In another example, voltage regulator 200 can represent a voltage regulator for one or more memory modules, such as DDR-3 or DDR-4 Dual In-Line Memory Modules (DIMMs). It will be understood that voltage regulator 200 can include one or more additional power stages similar to power stage 230, as needed or desired.

High-side MOSFET 234 and low-side MOSFET 236 represent switch devices, such as transistors, that are configured for providing power to the output of power stage 230. An example of power devices 234 and 236 include a power MOSFET, a JFET, an IGBT, a BJT, a thyristor, or another power device, as needed or desired. Low-side power device 236 is configured to include a reverse-biased diode element between the ground potential and the output of power stage 230. The diode can represent a separate device of power stage 230, but is more typically representative of a diode device that is formed as a by-product of the design of low-side power device 236. As such, the diode is typically referred to as a body diode.

MOSFET driver circuit 232 is configured to receive the PWM output from controller 212. The PWM output can issue one of three states, a high state, a low state, and an intermediate state between the high state and the low state, referred to as tri-state. When MOSFET driver circuit 232 detects that the PWM output is in the high state, the MOSFET driver circuit 232 operates to turn on high-side power device 234 to connect the input voltage $V_{IN}$ to the output of power stage 230, and to turn off low-side power device 236 to isolate the output of the power stage from the ground potential 262. When MOSFET driver circuit 232 detects that the PWM output is in the low state, the MOSFET driver circuit 232 operates to turn off high-side power device 234 to isolate the output of power stage 230 from the input voltage $V_{IN}$, and to turn on low-side power device 236 to connect the output of the power stage to the ground potential 262. When MOSFET driver circuit 232 detects that the PWM output is in the tri-state, the MOSFET driver circuit 232 operates to turn off both high-side and low-side power devices 234 and 236 to isolate the output from both the input voltage $V_{IN}$ and the ground plane.

Voltage regulator controller 212 operates to provide PWM signals to power stage 230 to provide an average voltage level at its respective outputs that is shaped by the voltage shaping elements into a smooth and steady output voltage $V_{OUT}$. As such, voltage regulator controller 212 includes output sensing logic, such as a voltage level detector within power source 264 to detect a level of the output voltage $V_{OUT}$, a current detector to detect a load current, or the like. Based upon the information received by the output sensing logic, voltage regulator controller 212 varies the configuration of the PWM outputs to adapt the operation of power stage 230 to maintain the smooth and steady output voltage $V_{OUT}$. For example, when voltage regulator controller 212 detects a low power demand, such as by detecting a low load current, then voltage regulator controller 212 can provide PWM signals with a low duty cycle. That is, the PWM signals can be provided such that a portion of a switching cycle in which the PWM signal is in the high state can be short, with the PWM signal switching to the low state for the remainder of the switching cycle. In another example, when voltage regulator controller 212 detects a high power demand, such as by detecting a high load current, then voltage regulator controller 212 can provide PWM signals with a higher duty cycle. That is, the PWM signals can be provided such that a portion of the switching cycle in which the PWM signal is in the high state can be longer, again with the PWM signal switching to the low state for the remainder of the switching cycle.

As load 250 switches between low demand operating states and high demand operating states, voltage regulator 210 operates to quickly adapt the operation of power stages to satisfy the increasing demand. In particular, capacitor 246 can be sized so as to provide power to load 250 in an interim between when the demand increases, and when power stage 230 can be directed to provide increased power based upon the received, higher duty cycle, PWM signals. On the other hand, as load 250 switches between high demand operating states and low demand operating states, voltage regulator 210 is faced with the challenge to suppress voltage overshoot at the load in the interim between when the demand decreases and when the power stage 230 can be directed to provide decreased power based upon the received, lower duty cycle, PWM signals.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system including:
   a power source comprising a voltage regulator control circuit having a programming resistor input pin for receiving an input from a programming resistor, an ammeter input for receiving a current value, and a local positive voltage sensing lead input for locally sensing a power source output voltage of the power source, the local positive voltage sensing lead input connected to a first voltage divider resistor, the first voltage divider resistor connected to a feedback voltage node, the feedback voltage node connected to a second voltage divider resistor, wherein the programming resistor input pin is not connected to the feedback voltage node; and
   a load circuit coupled to the power source for receiving power from the power source.

2. The information handling system of claim 1 wherein the load circuit is coupled to the power source via a non-remote-sensing power connection.

3. The information handling system of claim 1 wherein the voltage regulator control circuit determines a power source voltage adjustment value based on a resistance of the programming resistor and based on the current value.

4. The information handling system of claim 3 wherein the power source voltage adjustment value is proportional to the resistance of the programming resistor and is proportional to the current value.

5. The information handling system of claim 1 wherein the programming resistor is configured as a resistor network.

6. The information handling system of claim 5 wherein the resistor network comprises a thermal compensation element.

7. The information handling system of claim 1 wherein the voltage regulator control circuit assures a reliable input to an overvoltage protection circuit of the voltage regulator control circuit regardless of states of connections of the load circuit to the power source.

8. An apparatus comprising:
   a voltage regulator control circuit, the voltage regulator control circuit including a programming resistor input pin for receiving an input from a programming resistor, the voltage regulator control circuit further including an ammeter input for receiving a current value, the voltage regulator circuit further including a local positive voltage sensing lead input for locally sensing a power source output voltage, the local positive voltage sensing lead input connected to a first voltage divider resistor, the first voltage divider resistor connected to a feedback voltage node, the feedback voltage node connected to a second voltage divider resistor, wherein the programming resistor input pin is not connected to the feedback voltage node.

9. The apparatus of claim 8 further comprising:
a power stage circuit coupled to the voltage regulator control circuit, the power stage circuit for providing power to a load circuit coupled to the power stage circuit via a non-remote-sensing power connection.

10. The apparatus of claim 8 wherein the voltage regulator control circuit determines a power source voltage adjustment value based on a resistance of the programming resistor and based on the current value.

11. The apparatus of claim 10 wherein the power source voltage adjustment value is proportional to the resistance of the programming resistor and is proportional to the current value.

12. The apparatus of claim 8 wherein the programming resistor is configured as a resistor network.

13. The apparatus of claim 12 wherein the resistor network comprises a thermal compensation element.

14. The apparatus of claim 8 wherein the voltage regulator control circuit assures a reliable input to an overvoltage protection circuit of the voltage regulator control circuit regardless of states of connections of the load circuit to the voltage regulator control circuit.

15. A method comprising:
receiving a programming resistor input value from a programming resistor input pin coupled to a programming resistor;
receiving a current value at an ammeter input;
providing a voltage drop compensation value based on the programming resistor input value and based on the current value;
controlling an output voltage of a power source based on the voltage drop compensation value; and
locally sensing a power source output voltage of the power source at a local positive voltage sensing lead input, the local positive voltage sensing lead input connected to a first voltage divider resistor, the first voltage divider resistor connected to a feedback voltage node, the feedback voltage node connected to a second voltage divider resistor, wherein the programming resistor input pin is not connected to the feedback voltage node.

16. The method of claim 15 further comprising:
providing power to a load circuit, wherein the load circuit is coupled to a voltage regulator control circuit via a non-remote-sensing power connection.

17. The method of claim 15 wherein the voltage drop compensation value is proportional to the resistance of the programming resistor and is proportional to the current value.

18. The method of claim 15 wherein the programming resistor is configured as a resistor network.

19. The method of claim 15 further comprising:
thermally compensating the resistance of the programming resistor using a thermal compensation element.

20. The method of claim 15 further comprising:
assuring, by a voltage regulator control circuit, a reliable input to an overvoltage protection circuit of the voltage regulator control circuit regardless of states of connections of a load circuit to the power source.

* * * * *